US007478706B2

(12) United States Patent
Kocher et al.

(10) Patent No.: US 7,478,706 B2
(45) Date of Patent: Jan. 20, 2009

(54) METHOD AND APPARATUS OF OPERATING A DRIVE WITH LINEAR MOTOR

(75) Inventors: Johannes Kocher, Udligenswil (CH); Jörg Evertz, Zürich (CH)

(73) Assignee: Inventio AG, Hergiswil NW (CH)

( * ) Notice: Subject to any disclaimer, the term of this patent is extended or adjusted under 35 U.S.C. 154(b) by 556 days.

(21) Appl. No.: 10/823,269

(22) Filed: Apr. 13, 2004

(65) Prior Publication Data

US 2004/0216960 A1 Nov. 4, 2004

(30) Foreign Application Priority Data

Apr. 14, 2003 (EP) ................................ 03405257

(51) Int. Cl.
*B66B 1/06* (2006.01)
*H02K 41/02* (2006.01)

(52) U.S. Cl. ....................... 187/293; 187/277; 187/289; 187/276; 318/135

(58) Field of Classification Search ................ 187/289, 187/293
See application file for complete search history.

(56) References Cited

U.S. PATENT DOCUMENTS 5,183,980 A * 2/1993 Okuma et al. ............... 187/289
5,189,268 A 2/1993 Pavoz et al.
5,203,430 A * 4/1993 Grinaski et al. ............ 187/276
5,203,432 A * 4/1993 Grinaski ..................... 187/251
5,235,226 A * 8/1993 Olsen et al. .................... 310/12
5,518,087 A * 5/1996 Hwang et al. ............... 187/374
5,625,174 A * 4/1997 Ito et al. ...................... 187/289
5,841,082 A * 11/1998 Rivera et al. ................ 187/316
5,949,036 A * 9/1999 Kowalczyk et al. ......... 187/316
6,305,501 B1 * 10/2001 Kahkipuro et al. .......... 187/289
6,675,938 B2 * 1/2004 Yamamoto et al. .......... 187/316
6,742,631 B2 * 6/2004 Grundmann ................ 187/315
2002/0050426 A1 * 5/2002 Yamamoto et al. .......... 187/316
2003/0000778 A1 * 1/2003 Smith et al. ................. 187/902
2003/0106746 A1 * 6/2003 Grundmann ................ 187/289
2005/0087400 A1 * 4/2005 Zhou .......................... 187/277
2007/0199770 A1 * 8/2007 Kocher ....................... 187/277

FOREIGN PATENT DOCUMENTS

EP 0 503 980 9/1992

* cited by examiner

*Primary Examiner*—Walter Benson
*Assistant Examiner*—Eduardo Colon-Santana
(74) *Attorney, Agent, or Firm*—Fraser Clemens Martin & Miller LLC; William J. Clemens

(57) ABSTRACT

A drive, a method of operating the drive and an elevator operated by the drive for the movement of persons or goods by at least one car utilize a linear motor. The drive includes at least one linear motor with a secondary part positioned between a first primary part and a second primary part. The drive also includes at least one compensation device that acts by a compensating normal force against an attractive normal force between each of the primary parts and the secondary part.

15 Claims, 3 Drawing Sheets

METHOD AND APPARATUS OF OPERATING A DRIVE WITH LINEAR MOTOR

BACKGROUND OF THE INVENTION

The present invention relates to a drive with a linear motor, an elevator with this drive and a method of operating this drive.

A drive with a linear motor does not, as is known, perform any braking function. Accordingly, in the case of an elevator with such a drive the functions of a holding brake and a safety brake have to be provided by specialized subassemblies.

SUMMARY OF THE INVENTION

A first object of the present invention is to provide a drive with a linear motor that equally executes a braking function. A second object of the present invention is to provide a method of operating this drive. The third object of the present invention is to provide an elevator with such a drive.

The present invention meets these objects by with a drive, a method of operating this drive and an elevator with this drive, which drive comprises at least one linear motor with a secondary part between a first primary part and a second primary part and which drive comprises at least one compensation means acting by a compensating normal force against an attractive normal force between the primary parts and the secondary part. The attractive normal force and the compensating normal force are effective in a direction of action transverse to the direction of movement of the drive.

The drive is thus guided and braked by a total normal force which is composed of the attractive normal force between the primary parts and the secondary part less the compensating normal force of the compensation means. The drive according to the present invention utilizes the large attractive normal force present in linear drives in order to thus achieve a braking function of the drive. For selective change in the total normal force there is carried out a) advantageously a movement towards or movement away of the primary parts with respect to the secondary part by way of setting elements in order to vary a width of air gaps between the primary parts and secondary part, or b) advantageously an activation or deactivation of the linear motor. The width of the air gaps is ascertained along the direction of action transversely to the direction of movement of the drive. In that case distinction is made between the following four operating modes:

1) In a first operating mode the linear motor is deactivated and solely the compensating normal force of the compensation means spaces the primary parts from the secondary part, which guides the drive in a holding manner. The width of the air gaps is set to be freely selectable at the maximum or at the minimum.

2) In a second operating mode the linear motor is activated and the width of the air gaps between the primary parts and the secondary part is set to a maximum. The attractive normal force between the primary parts and the secondary part is then small, which guides the drive in a holding manner.

3) In a third operating mode the linear motor is activated and the width of the air gaps between the primary parts and the secondary part is set to a minimum. The attractive normal force between the primary parts and the secondary part is then large, which brakes the drive.

4) In a fourth operating mode the compensation means is deactivated and the primary parts are pressed by the full attractive normal force of the linear motor against the secondary part, which brakes the drive in a safety braking operation.

The elevator comprises at least one car for moving persons or goods by this drive. The drive advantageously consists of a plurality of linear motors connected in series. Drives with multiple total power outputs can thus be combined according to the modular principle with little effort and low costs. The width of the air gaps between the primary parts and the secondary part of each linear motor is individually controlled, so that undesired influences of contact, which damage the linear motor, of the primary parts with the secondary part or fluctuations in power output due to changes in the width of the air gaps are avoided.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
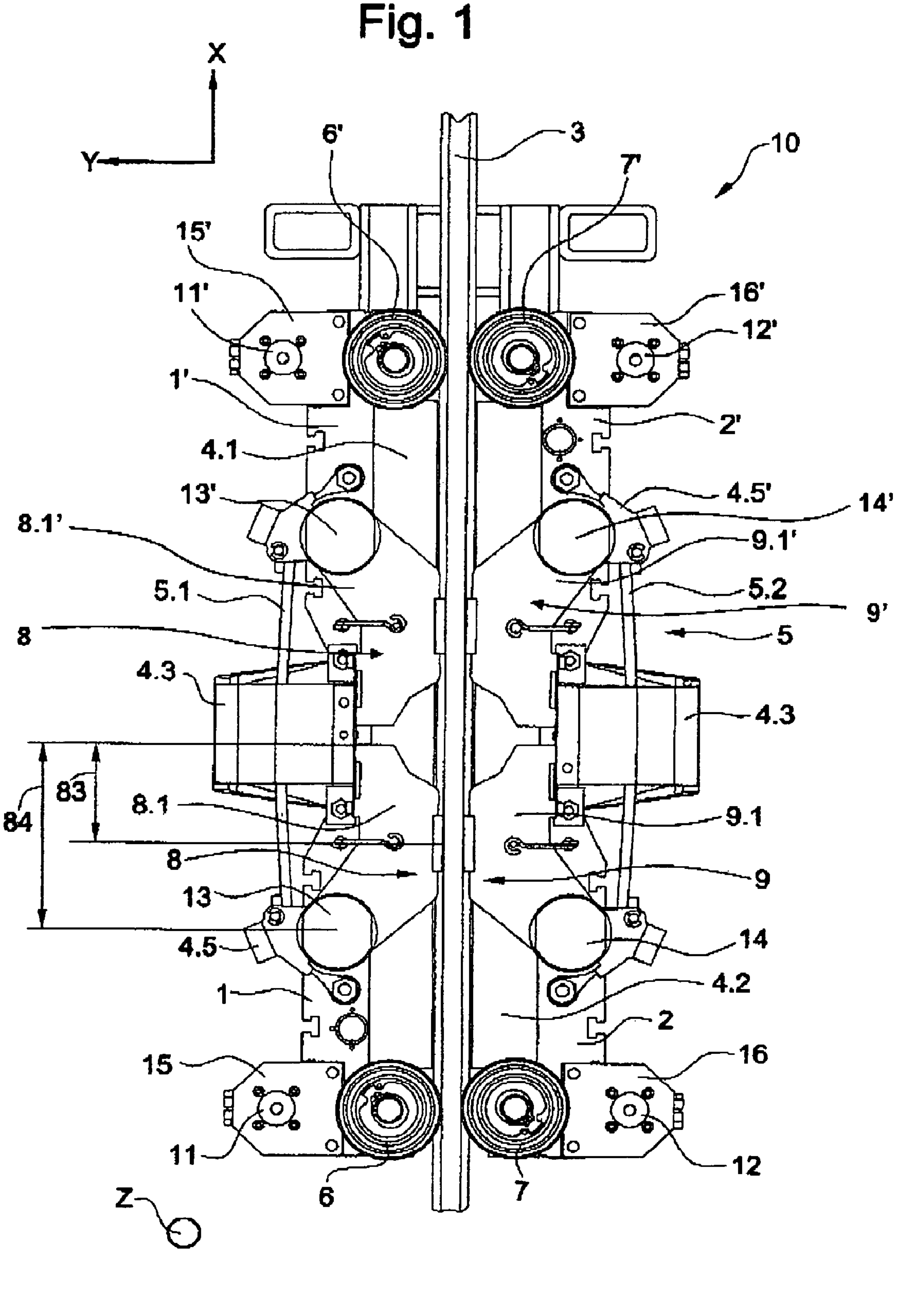
FIG. 1 is a schematic illustration, in section, of a part of a drive according to the present invention.
Figure 2:
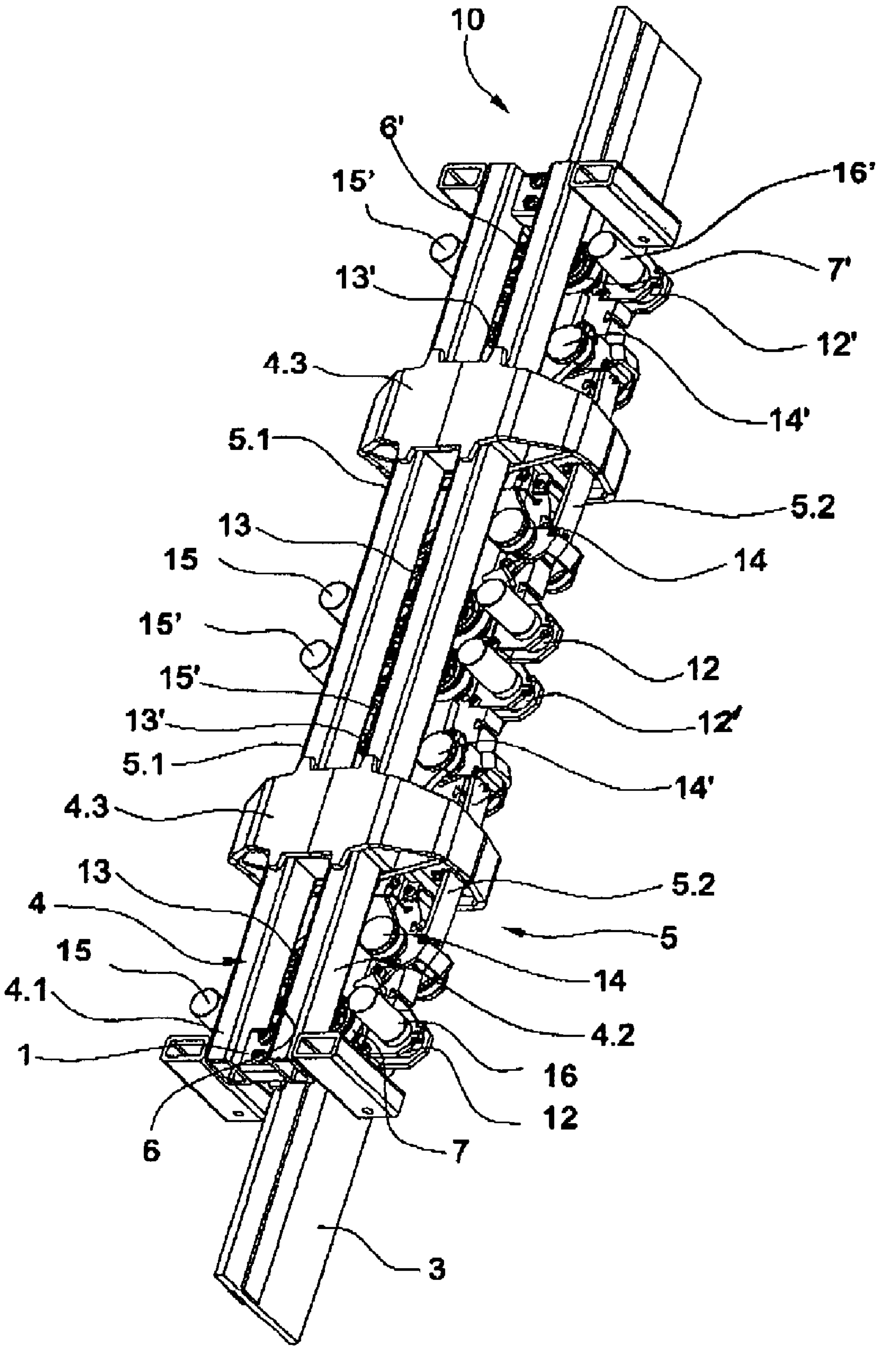
FIG. 2 is a perspective view of a part of the drive shown in FIG. 1.

FIGS. 1 and 2 show schematic illustrations of one form of embodiment of a drive 10 according to the present invention. The drive 10 comprises at least one linear motor, in which at least one first primary part 1, 1' and at least one second primary part 2, 2' are spaced from one another in a plane X-Y by a secondary part 3. The first primary parts are disposed on a first side of the secondary part and the second primary parts are disposed on a second side of the secondary part. According to FIG. 1, the drive 10 comprises two linear motors, of which a first linear motor consists of a first pair of the primary parts 1, 2 around the secondary part 3 and a second linear motor consists of a second pair of the primary parts 1', 2' around the secondary part 3. The linear motor is a synchronous linear motor, the primary parts of which are excited by permanent magnets of the secondary part. Any known permanent magnets can be used. The primary parts have windings through which an electrical current can flow in known manner. In the case of current flow, an attractive normal force acts between each of the primary parts and the secondary part along the direction "Y" of action transverse to the direction of movement of the drive 10. If no electrical current flows, the linear motor is deactivated. A residual normal force acting between the secondary part 3 and the current-free primary parts 1, 2, 1', 2' is disregarded within the scope of this description.

The drive 10 consists of, for example, however many linear motors which are arranged in a row along the direction "X" of movement of the drive. Thus, FIG. 2 corresponds with FIG. 1 with the difference that in FIG. 2 two drive units according to FIG. 1 are connected in series to form an overall drive unit. Depending on the respectively desired total power, this overall drive unit is thus assembled in modular principle from several relatively short linear motors. This has three advantages:

a) the overall drive unit is simple and able to be quickly adapted to the multiplicity of total power outputs desired by customers;

b) these numerous total power outputs are achieved by the series connection of identical linear motors, with low costs; and c) non-rectilinearities of the secondary part do not have any disadvantageous effect on the plurality of relatively short primary parts. Each linear motor is individually guided and a width of air gaps between the primary parts and secondary part remains controlled, which avoids undesired instances of contact, which damage the linear motor, of the primary parts with the secondary part as well as fluctuations in power output due to changes in width of the air gaps.

The drive 10 comprises a support means 4 which carries all components of the drive with the exception of the secondary part. According to FIGS. 1 and 2 the support means consists of two struts 4.1, 4.2, wherein the first longitudinal strut 4.1 is arranged on the first side of the secondary part and the second longitudinal strut 4.2 is arranged on the second side of the secondary part. The support means is stiff in bending and constructed, for example, in metal. The longitudinal struts are connected by means of a U-shaped transverse strut 4.3 in the direction "Y" of action.

The drive 10 is guided along the secondary part by way of at least one guide element 6, 6', 7, 7'. According to FIG. 1 the guide element 6, 6', 7, 7' is mounted in each primary part 1, 1', 2, 2'. The guide elements are mounted in pairs on both sides at the secondary part in end regions of the primary parts and are borne on eccentric shafts 11, 11', 12, 12'. A uniformly distributed and stable guidance of the drive along the secondary part is effected by these four guide elements.

The drive comprises at least one compensation means 5, which acts by a compensating normal force against the attractive normal force between each of the primary parts and the secondary part. According to FIG. 1, the compensation means is a first spring 5.1, the spring ends of which connect together the first primary parts 1, 1' at the first side of the secondary part and urge them away from the secondary part. The compensation means is a second spring 5.2, the spring ends of which on the second side of the secondary part urge the second primary parts 2, 2' at away from the secondary part. The compensation means is arranged substantially along the direction of movement of the drive. The compensation means is made of known and proven resilient materials, such as metal. Advantageously, the compensation means is fastened in the support means and the compensation means carries the primary parts. For example, the first and second springs are fastened in end regions of the U-shaped transverse strut. For example, the first spring carries the first primary parts and the second spring carries the second primary parts.

The drive 10 is held and braked at the secondary part by way of at least one braking element 8, 8', 9, 9'. According to FIG. 1 the braking element 8, 8', 9, 9' is mounted in each primary part 1, 1', 2, 2'. The braking elements are arranged in pairs at both sides at the secondary part. Each braking element is connected with the support means 4 by way of a brake lever 8.1, 8.1', 9.1, 9.1'. Each of the brake levers has a first and a second brake lever end. The first brake lever end is mounted on a shaft 13, 13', 14, 14' in the respective primary part and the second brake lever end is connected with the support means. A uniformly distributed and stable braking of the drive along the secondary part is effected by these four brake elements.

The eccentric shafts 11, 11', 12, 12' can rotate in the plane X-Y about a setting axis "Z" by means of at least one setting element 15, 15', 16, 16'. According to FIG. 1 each eccentric shaft is rotated by a setting element. The setting elements are electric motors which rotate the eccentric shafts back and forth through a setting angle. In a first end setting the guide elements are in direct contact with the secondary part and the brake elements are without contact with respect to the secondary part. In a second end setting the guide elements are without contact with respect to the secondary part and the brake elements are in direct contact with the secondary part. In the current-free state of the setting elements the eccentric shafts automatically rotate back into the second end setting under the effect of the attractive normal force until the brake elements rest on the secondary part. The braking function and the safety braking function of the drive is effected by friction at the secondary part. The guide elements and brake elements are coatings, rollers, rollable elements, balls, etc., which consist of known materials such as metal, ceramic, hard rubber, etc. In the case of use of rollers, rollable elements or balls for the guide elements, these have a rolling friction on the secondary part. In the case of use of coatings for the braking elements, these have a sliding friction on the secondary part. With knowledge of the present invention setting elements which are actuated not electrically, but hydraulically or pneumatically or by a Bowden pull can also be used.

Through rotation of the eccentric shafts 11, 11', 12, 12' forwards and backwards the primary parts 1, 1', 2, 2' are moved towards the secondary part 3 or moved away from the secondary part 3. The compensation means 5 is not, however, influenced by the forward and backward rotation of the eccentric shafts. The forward and backward rotation of eccentric shafts is indicated in FIG. 1 by curved double arrows. The width of air gaps between the primary parts and the secondary part is thereby varied. The width of the air gaps changes along a direction of action transverse to the direction of movement of the drive. In a first end setting, where the guide elements guide the drive in contact with the secondary part, the width of the air gaps is at a maximum and the attractive normal force between the primary parts and the secondary part is small. In the second end setting, where the brake elements keep the drive in contact with the secondary part, the width of the air gaps is at a minimum and the attractive normal force between the primary parts and the secondary part is large. The width of the air gaps is, for example, continuously changed, whereby the attractive normal force is correspondingly continuously reduced or increased. For example, the attractive normal force is as small as possible in the first end setting and the attractive normal force is as large as possible in the second end setting.

On rotation of the eccentric shafts the second brake lever ends form fixed points which do not change their spacing from the secondary part 3, whilst the first brake lever ends, which are mounted in the primary parts, change their spacing from the secondary part. The distance between the first and second brake lever ends is denoted by a brake lever length 84. The distance between the projection of the brake elements on the connecting lines of the brake lever ends and the second brake lever ends is denoted by a brake length 83. Depending on the respective size of the ratio of the brake lever length divided by the brake length the brake elements are pressed by a lever against the secondary part. According to FIG. 1 the ratio of the lever is 2:1. In the second end setting where the brake elements keep the drive in contact with the secondary part, the compensating normal force of the compensation means 5 acts as a braking force reinforced by this lever.

The drive 10 comprises at least one safety brake trigger 4.5, 4.5° which fixes the compensation means 5 at least partly in the primary parts 1, 1', 2, 2'. The brake trigger can be brought into two settings. In a normal operating setting the compensating means is activated and the safety brake trigger maintains the bias of the compensation means. In a safety brake setting the compensation means is deactivated and the safety brake trigger has released the bias of the compensation means. According to FIG. 1 the compensation means consists of a spring 5.1 which connects the primary parts 1, 1' and of a spring 5.2 which connects the primary parts 2, 2'. Each spring is tensioned at at least one spring end by a safety brake trigger in the primary part. The safety brake trigger comprises at least one support which holds the spring ends in the direction "Y" of action and urges the primary parts away from the secondary part. The deactivation of the safety brake trigger is carried out mechanically or electrically in known manner. According to FIG. 1 the safety brake trigger is mechanically rotated about the setting axis "Z" for deactivation. The support thereby laterally slides from the spring end and the spring correspondingly relaxes. In the case of absence of the compensating normal force of the compensation means the attractive normal force of the primary parts comes fully into effect and is correspondingly large due to the air gaps of minimum width. The drive is then pressed against the secondary part solely by the attractive normal force of the primary parts. In that case the brake elements brake by friction on the secondary part, which executes a safety brake function. A car or a counterweight is braked and held by this safety brake function in the case of excess speed.

Figure 3:
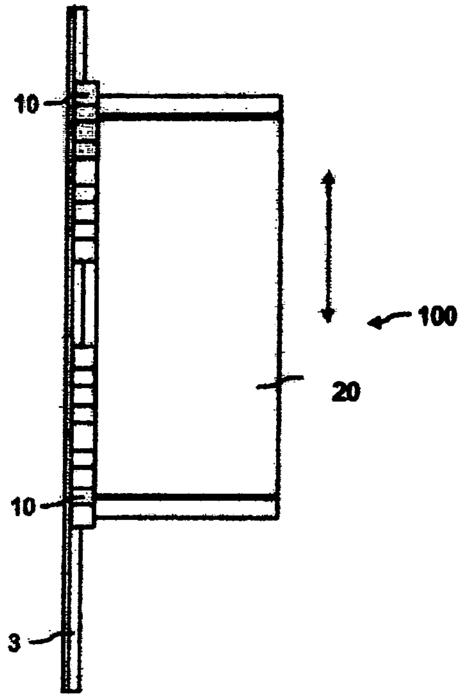
FIG. 3 is a schematic illustration of a first embodiment of an elevator with the drive according to the present invention.
Figure 4:
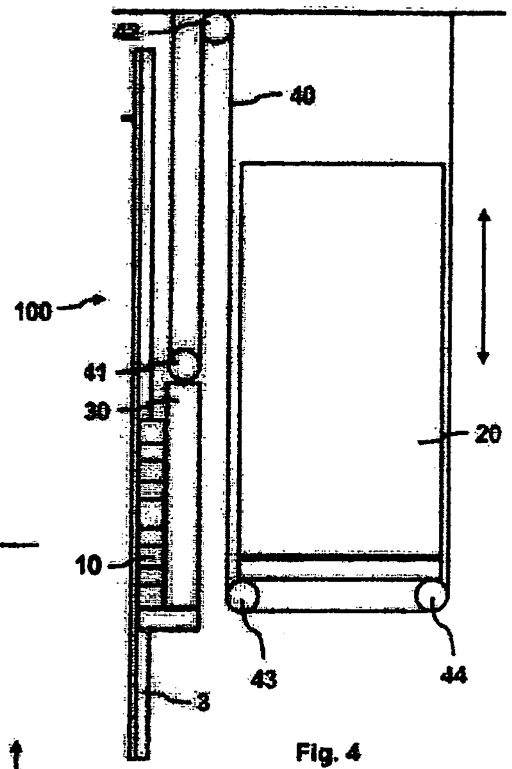
FIG. 4 is a schematic illustration of a second embodiment of an elevator with the drive according to the present invention.
Figure 5:
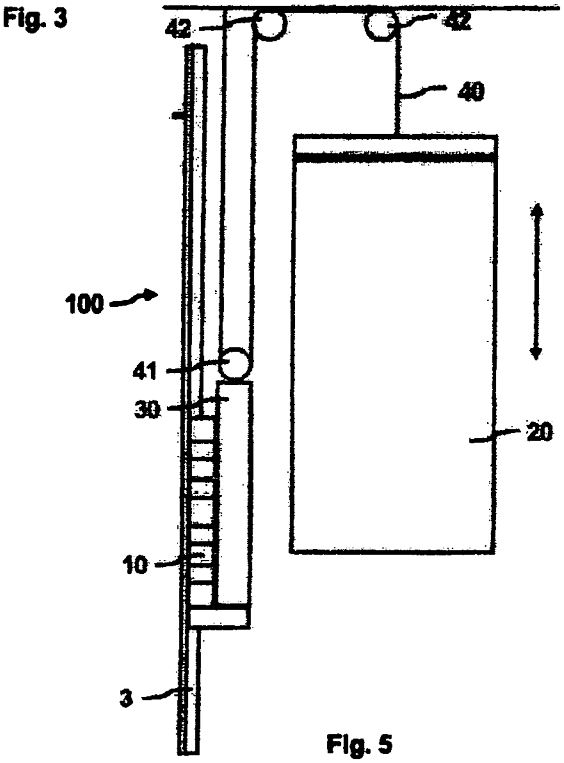
FIG. 5 is a schematic illustration of a third embodiment of an elevator with the drive according to the present invention.

FIGS. 3 to 5 show three schematic illustrations of forms of embodiment of an elevator 100, which is driven by the drive 10. According to FIG. 3 the drive 10 drives, in a direct manner, at least one car 20, for movement of persons or goods, of the elevator. According to FIG. 4 the drive drives, in a direct manner, at least one counterweight 30, wherein the car and the counterweight are connected by way of at least one connecting means 40. The connecting means is a cable or belt with at least one load-accepting strand of steel, aramide, etc. Not only the car, but also the counterweight are moved by a 2:1 slinging. The connecting means is deflected over several deflecting rollers 41, 42, 43, 44. The first deflecting roller 41 is mounted at the counterweight, at least one of the second deflecting roller 42 is mounted in the shaft head and the third and fourth deflecting rollers 43, 44 are mounted at the car. FIG. 5 corresponds with FIG. 4, with the difference that only the counterweight is slung 2:1, whilst the car is slung 1:1. In this manner the counterweight is moved at half the speed of the car.

The secondary part 3 is at least one guide rail for the elevator. According to FIG. 3 the car is moved as a cantilever car by two drives along two guide rails, which guide rails extend over the entire length of a shaft in a building. According to FIGS. 4 and 5 the counterweight is moved by a drive along a single guide rail, which extends over the entire length of the shaft.

The elevator 100 with the car 20 and the counterweight 30 according to FIG. 4 has two advantages:

1) Firstly, through arrangement of the drive in the counterweight the car weight is reduced by the intrinsic weight of the drive. A drive with correspondingly reduced drive power is thereby required, which is favorable in cost.

2) Secondly, through connection of the car with the counterweight the load to be moved by the drive is reduced. Typically, the design of the counterweight is equal to the car empty weight plus half the useful load. A drive with correspondingly reduced drive power is thereby required, which is favorable in cost.

In addition to these advantages of the form of embodiment according to FIG. 4, the elevator 100 with the cage 20 and the counterweight 30 according to FIG. 5 has the advantage:

Only the counterweight is moved with a 2:1 slinging, whereas the car is moved by 1:1 slinging. The counterweight is thus moved over only half the length of the shaft, whilst the car is moved over the entire length of the shaft at twice the speed of the counterweight. The secondary part is thereby required with correspondingly halved length, which is favorable in cost.

With knowledge of the present invention a combination of these two forms of embodiment of the lift is obviously also possible. Numerous possibilities are available here to the expert:

1) It is thus possible to mount a single drive at the car and to move the car and counterweight in 1:1 slinging. Only a single drive with a drive power reduced in correspondence with the slinging is thereby necessary, which is favorable in cost.

2) Finally, it is possible to move the car or the counterweight with higher degrees of slinging, such as 4:1.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A drive having at least one linear motor, which linear motor includes a secondary part positioned between a first primary part and a second primary part, the drive comprising: the primary parts being movable relative to one another, wherein the primary parts are selectively movable toward and away from one another, and at least one compensation means which acts by a compensating normal force against an attractive normal force between each of the primary parts and the secondary part, wherein the secondary part extends longitudinally along a first path, and the primary parts are coupled for movement together relative to the secondary part along the first path, wherein the primary parts are selectively movable toward and away from each other along a second path transverse to the first path.

2. The drive according to claim 1 wherein said compensation means carries the primary parts.

3. The drive according to claim 1 wherein the primary parts carry at least one guide element which guides the drive along the secondary part and that the primary parts carry at least one brake element which holds and brakes the drive along the secondary part.

4. The drive according to claim 3 wherein the primary parts carry at least one setting element which moves at least one of the guide element and the brake element towards the secondary part or away from the secondary part and brings said at least one of the guide element and the brake element into contact with the secondary part.

5. The drive according to claim 4 wherein the primary parts are separated from the secondary part by air gaps which change in the width thereof by movement of at least one of the guide element and the brake element towards and away from the secondary part.

6. The drive according to claim 5 wherein the width of the air gaps is at a maximum and the attractive normal force between the primary parts and the secondary part is small in a first end setting where the guide element guides the drive into contact with the secondary part and the width of the air gaps is at a minimum and the attractive normal force between the primary parts and the secondary part is large in a second end setting where the brake element keeps the drive in contact with the secondary part.

7. The drive according to claim 4 wherein the setting elements do not move the compensation means towards or away from the secondary part, the brake element is connected by way of a brake lever with a support means and the brake element presses by a lever against the secondary part.

8. The drive according to claim 7 wherein the support means comprises at least one safety brake trigger, that the activated safety brake trigger fixes the compensation means, which is biased by the compensating normal force, at least partly in the primary parts and the deactivated safety brake trigger releases the compensating normal force of the compensation means.

9. The drive according to claim 1 wherein the drive comprises a plurality of linear motors connected in series.

10. A method of operating a drive with at least one linear motor, which linear motor includes a secondary part positioned between a first primary part and a second primary part, comprising the steps of: a) providing an attractive normal force that acts between each of the primary parts and the secondary part along a direction (Y) of action transverse to a direction (X) of movement of the drive wherein the primary parts are movable relative to one another and selectively movable toward and away from one another, and b) providing at least one compensation means that acts against the attractive normal force by a compensating normal force, wherein the secondary part extends longitudinally along a first path, and including coupling the primary parts for movement together relative to the secondary part along the first path, and selectively moving the primary parts toward and away from each other along a second path transverse to the first path.

11. The method according to claim 10 including a step of operating the linear motor in a first operating mode wherein the linear motor is deactivated and solely the compensating normal force of the compensation means spaces the primary parts from the secondary part, which guides the drive in a holding manner, or operating the linear motor in a second operating mode wherein the linear motor is activated and a width of air gaps between the primary parts and the secondary part is set to a maximum, which reduces the attractive normal force between the primary parts and the secondary part and guides the drive in holding manner, or operating the linear motor in a third operating mode wherein the linear motor is activated and a width of air gaps between the primary parts and the secondary part is set to a minimum, which increases the attractive normal force between the primary parts and secondary part and brakes the drive, or operating the linear motor in a fourth operating mode wherein the compensation means is deactivated and the primary parts are pressed by the full attractive normal force of the linear motor against the secondary part, which brakes the drive.

12. An elevator comprising: at least one car for moving persons or goods; a drive including at least one linear motor with a secondary part positioned between a first primary part and a second primary part; and at least one compensation means which acts by a compensating normal force against an attractive normal force between each of the primary parts and the secondary part, the primary parts being movable relative to one another and selectively movable toward and away from one another, wherein the secondary part extends longitudinally along a first path, and the primary parts are coupled for movement together relative to the secondary part along the first path, wherein the primary parts are selectively movable toward and away from each other along a second path transverse to the first path.

13. The elevator according to claim 12 wherein said drive drives the car directly or drives a counterweight directly.

14. The elevator according to claim 13 wherein the car and the counterweight are connected by way of at least one connecting means and the drive moves one of the car and the counterweight with a 2:1 slinging or a 1:1 slinging.

15. The elevator according to claim 13 wherein the car and the counterweight are connected by way of at least one connecting means and the secondary part extends over one of the entire length of the shaft and one half the length of the shaft.

* * * * *